United States Patent [19]

Gall et al.

[11] Patent Number: 4,503,594
[45] Date of Patent: Mar. 12, 1985

[54] METHOD FOR FABRICATING AN ORIFICE FITTING FOR A GAS PRESSURE DIFFERENTIAL-MEASURING SYSTEM

[75] Inventors: Adam F. Gall; Howard P. McJunkin, Jr., both of Charleston, W. Va.

[73] Assignee: McJunkin Corporation, Charleston, W. Va.

[21] Appl. No.: 513,859

[22] Filed: Jul. 14, 1983

Related U.S. Application Data

[62] Division of Ser. No. 436,458, Oct. 25, 1982, Pat. No. 4,422,339.

[51] Int. Cl.³ .............................................. B21D 53/10
[52] U.S. Cl. .............................. 29/157 R; 29/157.1 R; 29/445; 29/463; 29/DIG. 26; 29/DIG. 43; 73/861.61; 138/41; 138/44; 138/94.3; 251/329; 285/20; 285/416
[58] Field of Search .............. 29/157 R, 157.1 R, 445, 29/463, DIG. 26, DIG. 43; 73/861.52, 861.61, 861.62; 138/41, 44, 45, 94.3; 251/328, 329; 285/20, 416

[56] References Cited

U.S. PATENT DOCUMENTS

| 1,753,276 | 4/1930 | Quinn et al. ............... 251/328 X |
| 1,822,961 | 9/1931 | Emery ........................ 138/44 |
| 1,958,854 | 5/1934 | Kellett ....................... 138/44 |
| 1,980,699 | 11/1934 | Robinson .................... 138/44 |
| 2,585,290 | 2/1952 | Walker ....................... 73/861.61 |
| 3,027,135 | 3/1962 | Kellar ........................ 251/328 X |
| 3,319,661 | 5/1967 | Shindler ..................... 138/94.3 |
| 3,442,286 | 5/1969 | Anderson et al. ........... 251/328 |
| 3,624,882 | 12/1971 | Gustafson .................. 29/157.1 R |
| 3,718,314 | 2/1973 | Eikevik ...................... 251/329 |
| 3,993,092 | 11/1976 | Still ............................ 251/328 X |
| 4,377,274 | 3/1983 | Mayhew, Jr. ............... 251/328 X |
| 4,393,722 | 7/1983 | Scott ......................... 73/861.61 |
| 4,399,708 | 8/1983 | Van Scoy .................. 138/94.3 X |

Primary Examiner—Charlie T. Moon
Assistant Examiner—Ronald S. Wallace
Attorney, Agent, or Firm—Cushman, Darby & Cushman

[57] ABSTRACT

An orifice fitting for a gas pressure differential-measuring system is constructed of a fabricated body. In the fabrication, two lengths of flared or flanged pipe are inserted through the internal bores of respective orifice blocks and circumferentially welded on the outside. A U-member, which may be assembled of three straight pieces, is welded between the two blocks joining them and leaving a slot at the top. An orifice holder dependingly secured to a cover is provided with an orifice plate rimmed within a gasket and inserted through the slot. The cover is removably, sealingly mounted on the body. The outer face of the upstream face of the gasket is radially notched to equalize pressure in the orifice chamber.

3 Claims, 12 Drawing Figures

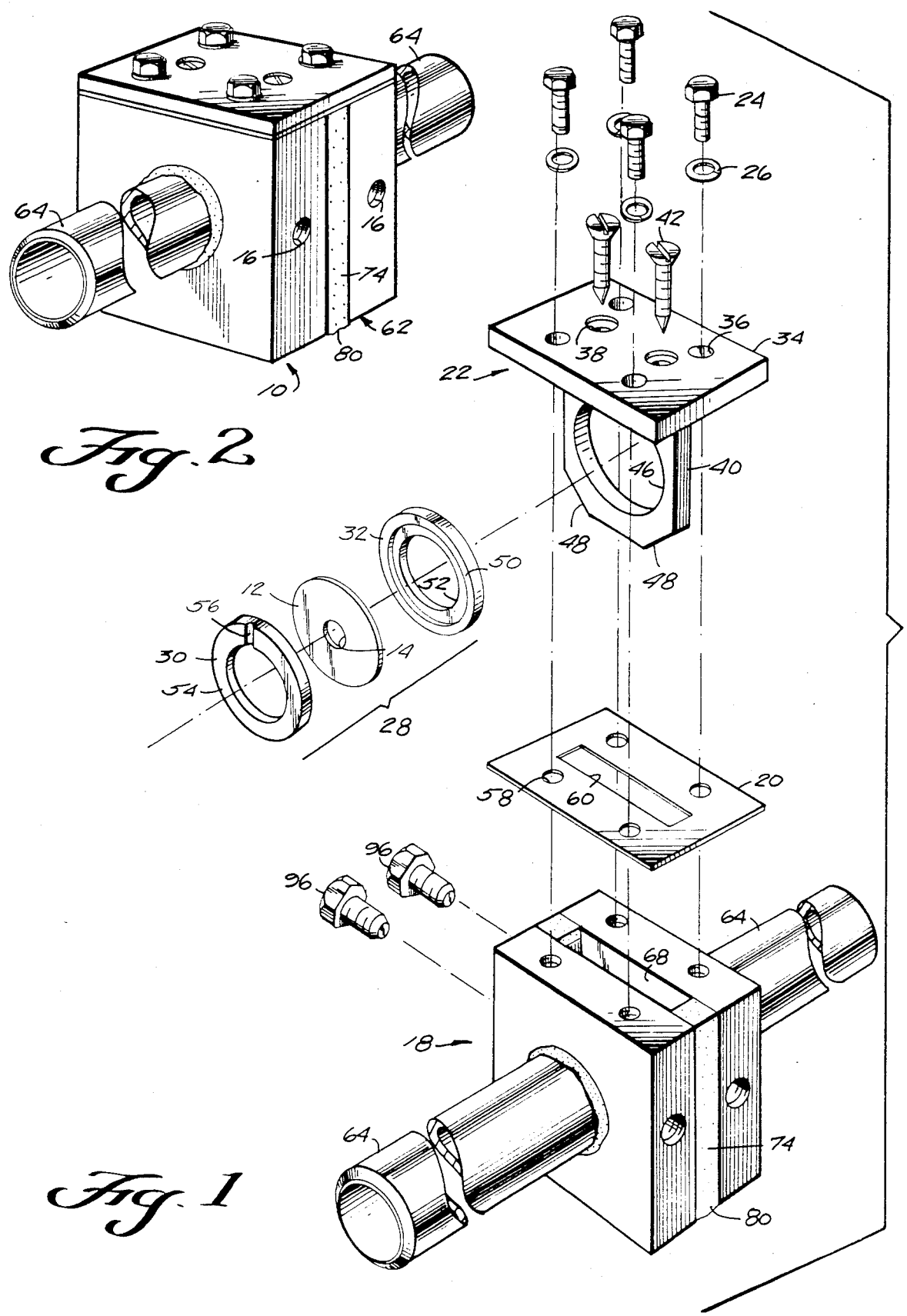

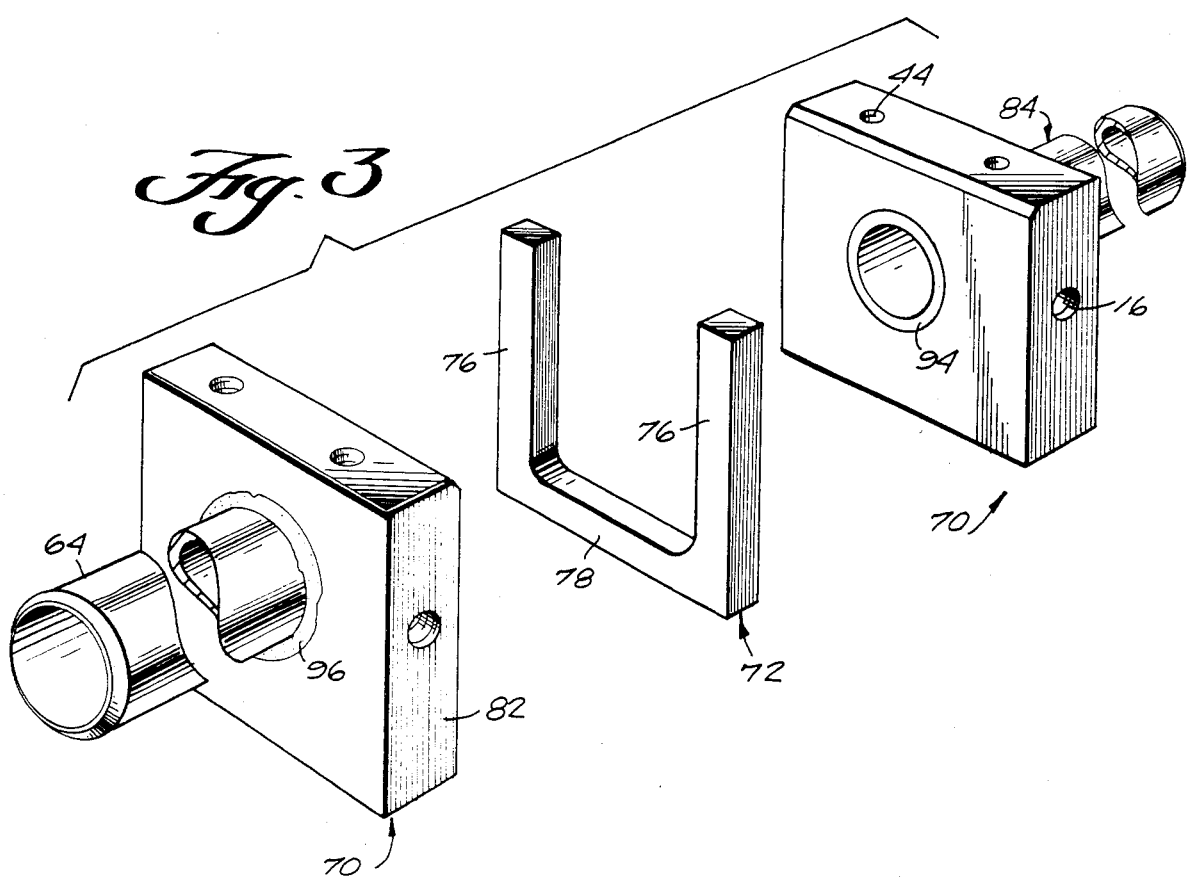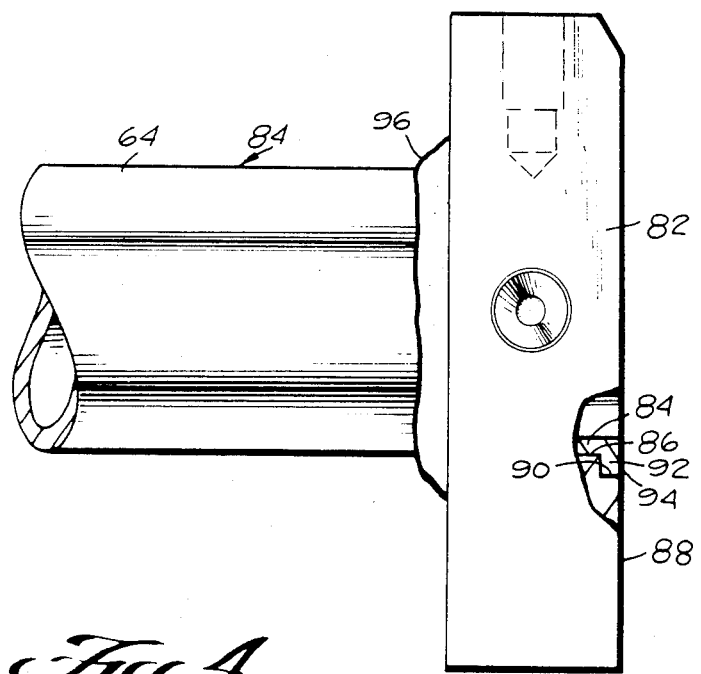

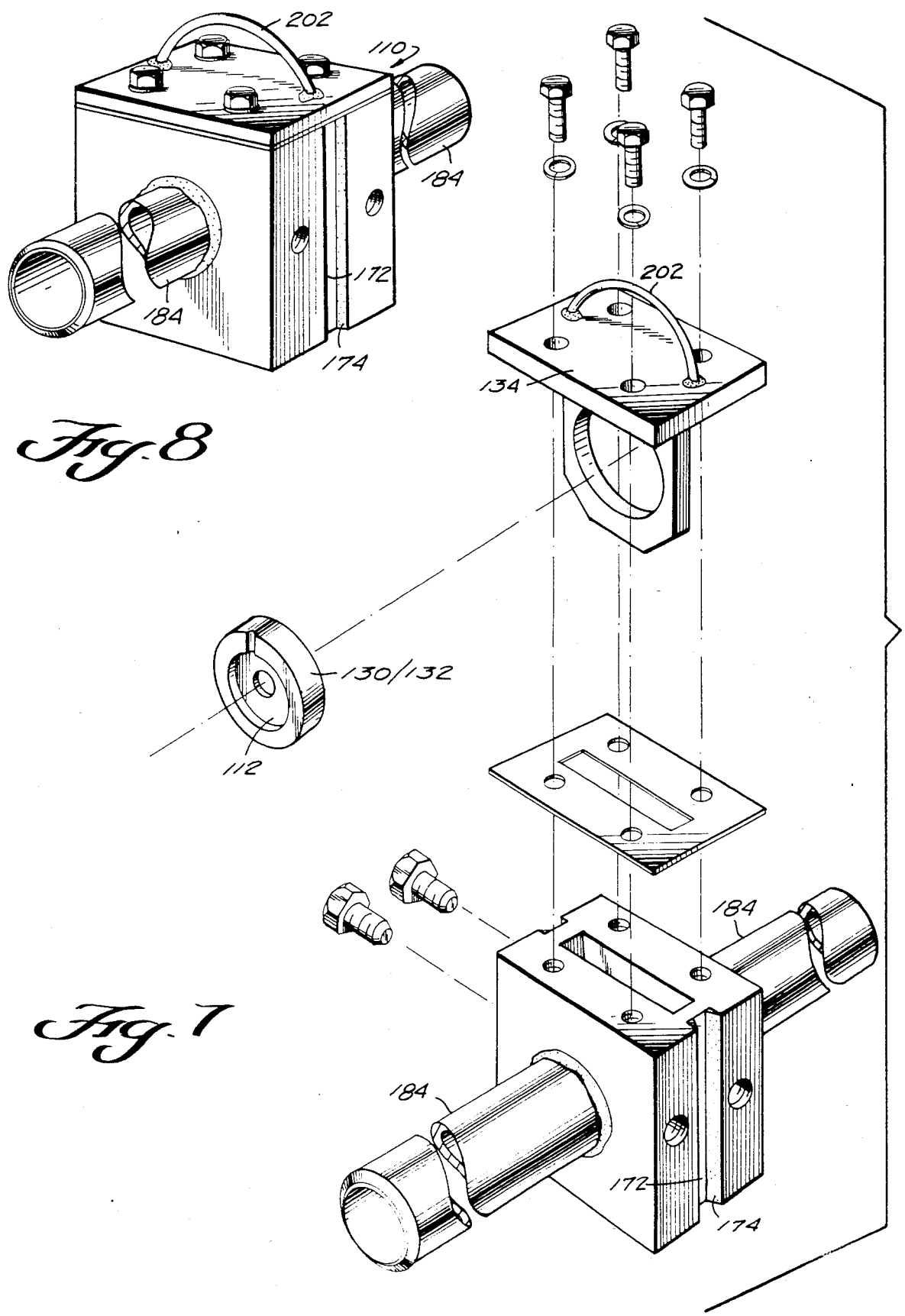

METHOD FOR FABRICATING AN ORIFICE FITTING FOR A GAS PRESSURE DIFFERENTIAL-MEASURING SYSTEM

This is a division of application Ser. No. 436,458 filed Oct. 25, 1982, now U.S. Pat. No. 4,422,339 issued Dec. 27, 1983.

BACKGROUND OF THE INVENTION

In piping systems for conducting gaseous fluid e.g. natural gas from one place to another, e.g. in connection with producing, gathering, collecting, processing, and/or transporting the gas, the need generally arises for measuring gas flow characteristics. For instance, it is conventional to partially obstruct the bore of the piping at a selected site using an orifice plate, and to measure differential pressure using taps located immediately upstream and downstream of the orifice plate.

Occasionally, there is a need to change-out the orifice plate, either because mechanically or chemically effected corrosion has changed its orifice size and shape, rendering collected differential pressure data difficult to interpret, or system flow characteristics have changed, so that a differently sized and/or shaped orifice is wanted.

Accordingly, there has arisen in the prior art orifice fittings, i.e. orifice plate holders which can be permanently mounted in a piping system, and from which the orifice plate may be removed and replaced with only partial disassembly of the orifice fitting itself, and with no need to either completely dis-install the orifice fitting, nor to jack the piping apart at the orifice fitting or partially disassemble the piping system.

However, in most instances, the prior art orifice fittings have been manufactured using castings and/or forgings for the orifice fitting bodies and other major parts. That has contributed excess weight, bulk and expense to the devices, and has necessitated either that the manufacturer build ahead for inventory in order to be able to fill orders in a reasonable time, or it has meant a long delay between receipt of an order and shipment of the goods. All of this is less tolerable in the marketplace of today than it once was.

Further, in most instances, the prior art orifice fittings have been factory-supplied with end connections which require that the user fabricate pipe nipples to the opposite ends in the field. This can prove inconvenient or troublesome, especially where the installer damages the body while attempting to field-attach pipe nipples to its end connections. Further, this field work may unacceptably add to the cost of making the installation due to excess labor and inspection costs.

SUMMARY OF THE INVENTION

An orifice fitting for a gas pressure differential-measuring system is constructed of a fabricated body. In the fabrication, two lengths of flared or flanged pipe are inserted through the internal bores of respective orifice blocks and circumferentially welded on the outside. A U-member, which may be assembled of three straight pieces, is welded between the two blocks joining them and leaving a slot at the top. A orifice holder dependingly secured to a cover is provided with an orifice plate rimmed within a gasket and inserted through the slot. The cover is removably, sealingly mounted on the body. The outer face of the upstream face of the gasket is radially notched to equalize pressure in the orifice chamber.

Thus the invention provides a device for use in a gas pressure differential flow-measuring system, wherein the device is designed to be an integral part of the conduit in which it disposes an orifice plate through which the gas must flow. In use differential pressure is conventionally detected on the two sides of the orifice plate, this being a factor in determining total flow in the system.

The orifice fitting is designed so that the orifice plate can be changed-out without disturbing the piping system.

In fabricating the body of the device from steel plate, an improvement over prior art devices made of cast steel is achieved, in that tight machining tolerances can be held, manufacturing costs can be kept down, and delivery times can be made short.

The insertion of flared or flanged pipe from the inside into bores in the orifice blocks permits the protruding stubs to be circumferentially welded to the outer faces of the orifice blocks to provide hub rings of desired length (e.g. a few inches to several feet). This method also allows accurate machining of the opposing sealing surfaces for engagement of the gasket assembly which houses the orifice plate. Accurate placement and machining of the the orifice tap passages also is facilitated. Use of flared pipe also provides the advantage of avoiding internal welds in the conduit.

By preference, the orifice plate sealing gasket assembly is slotted on one side in order to equalize the orifice chamber-to-line pressure.

The principles of the invention will be further discussed with reference to the drawings wherein a preferred embodiment is shown. The specifics illustrated in the drawings are intended to exemplify, rather than limit, aspects of the invention as defined in the claims.

BRIEF DESCRIPTION OF THE DRAWINGS

In the Drawings

FIG. 1 is an exploded perspective view of an orifice fitting constructed in accordance with principles of the present invention;

FIG. 2 is an assembled perspective view thereof;

FIG. 3 is a further-exploded perspective view of the body of the orifice fitting;

FIG. 4 is a side elevation view of one of the orifice block assemblies thereof, with a portion broken away to show details;

FIGS. 7–12 are respective similar view of a second, presently preferred embodiment of the orifice fitting.

DETAILED DESCRIPTION

Figure 5:
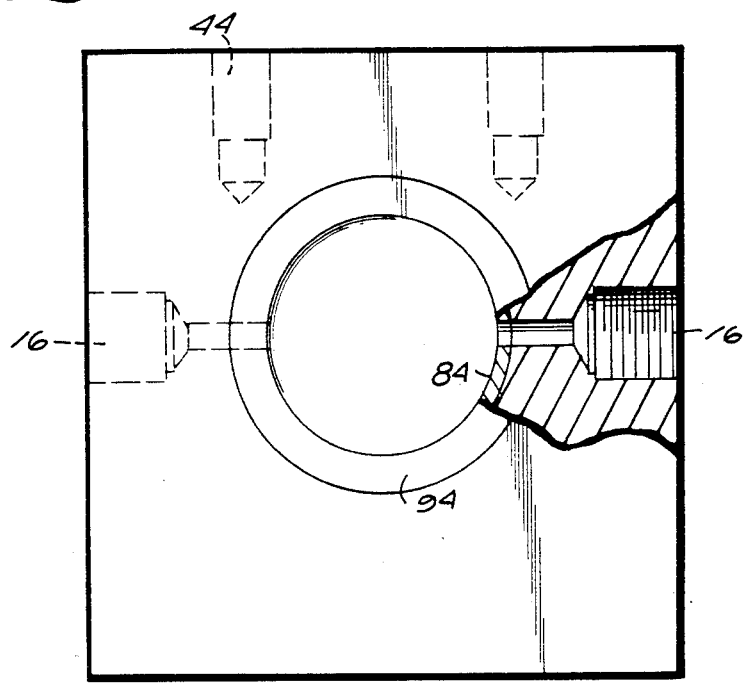
FIG. 5 is an inner end elevation view of that orifice block assembly, with another portion broken away to show details.

The purpose of the orifice fitting device 10 is to dispose in briefly-constricting relation at a site in a system of piping an orifice plate 12 having an orifice 14, so that pressures immediately upstream and downstream of the orifice can be measured via pressure taps 16. The orifice plate 12, its orifice 14, and the way in which pressure is monitored via the taps 16 are all utterly conventional. Elements 96 are plugs for conventionally closing a set of taps 16 not in use. What is new is that the device 10 is made in a different way, e.g. so that it may be about as large as a thick luncheon-sandwich, instead of about as large as a football, for devices of comparable utility. Also by making the device differently, it can be made more quickly, and more accurately at less expense, and be easier to install and service.

As shown in the first exploded perspective view, FIG. 1, the device 10 is seen to include a body 18, a cover gasket 20, and orifice holder assembly 22, bolts and lockwashers 24, 26 for removably, sealingly securing the orifice holder assembly on the body 18, and an orifice plate and seal assembly 28 comprising the orifice plate 12 sandwiched between two sealing rings 30, 32 of an orifice gasket.

The orifice holder assembly 22 includes as a cover 34 a generally rectangular, (e.g. 5.5 inch by 3.62 inch by 0.5 inch), horizontal steel plate or bar having a pattern of four holes 36 bored vertically therethrough in a rectangular pattern, and two laterally spaced, externally counterbored vertical holes 38 set on the transverse counterline. The assembly 22 further includes an orifice holder 40, e.g. made of the same type of steel plate or bar. Flat head socket screws 42 fasten down through the holes 38 into corresponding upwardly-opening threaded sockets in the upper end of the orifice holder 40 to unite the orifice plate to the cover. This provides a generally T-shaped member 22, in which the orifice holder 40 vertically depends from the underside of the cover 34. Holes 44 in device 10 are in alignment with holes 58 in gasket 20 and with holes 36 in cover 34, and are threaded to receive bolts 24.

The orifice holder 40 is provided with a relatively large opening 46 horizontally through the thickness thereof, located so as to be centered on the longitudinal axis of the device 10. The opening 46 is, typically, 3.06 inches in diameter. As shown, the lower outer corners of the orifice holder preferably are relieved, e.g. by having 0.87 inch of the 3.625 inch width trimmed off at a forty-five degree angle at each of the two lower corners 48.

The orifice and seal assembly 28 is sized so that its O.D. matches the I.D. of the orifice holder opening 46, and its thickness is somewhat greater than the thickness of the orifice holder 40. The orifice and seal assembly 28 is seen to include a standard orifice plate 12 sandwiched between two sealing rings 30, 32 made of usual material and comprising an orifice gasket. Each sealing ring 30, 32 is shown having a flat inner face 50 which is circumferentially relieved adjacent the radially inner extent thereof so as to cooperatively define, when the two faces 50 are registered in confronting abutment, a radially inwardly opening circumferential groove 52 in which the radially outer marginal edge of the orifice plate 12 is sealingly received.

The outer face 54 of the sealing ring 30 is provided with a radially extending notch or groove 56 extending from the I.D. to the O.D. thereof for pressure relief purposes.

The cover gasket 20 typically is a rectangular sheet of asbestos, neoprene, or similar gasket material provided with a pattern of four holes 58 matching that of the cover, and a laterally elongated, generally rectangular central slot 60 shaped and sized to receive the orifice holder 40.

The body 18, as fabricated, is seen to comprise a generally rectangular-prismatic member 62 (typically 3.62 inches thick by 5.50 inches wide and high), from both ends of which respective pipe stubs 64 project for any selected distance from a few inches to several feet (typically 4.5 inches to nearly six feet).

Figure 6:
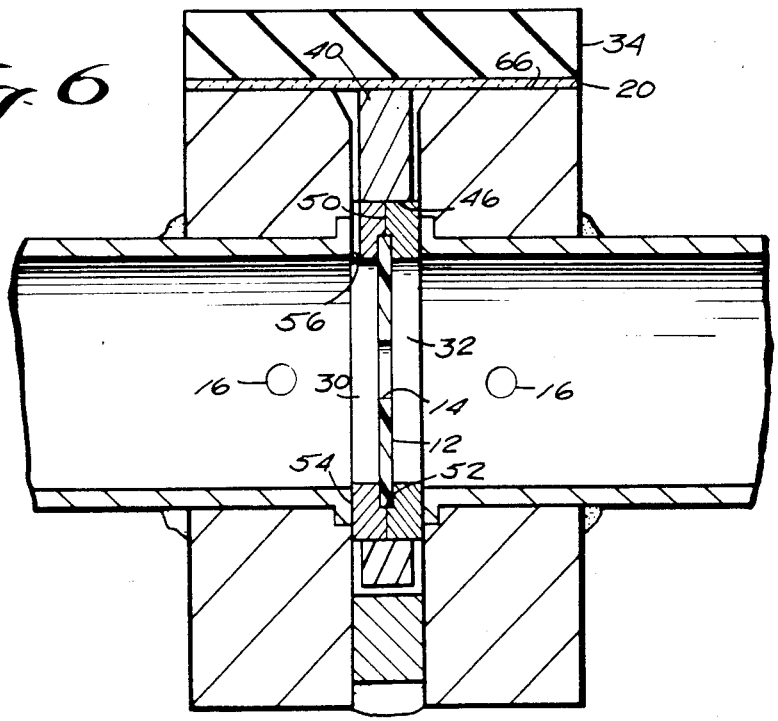
FIG. 6 is a longitudinal vertical sectional view of the assembled orifice fitting.
Figure 9:
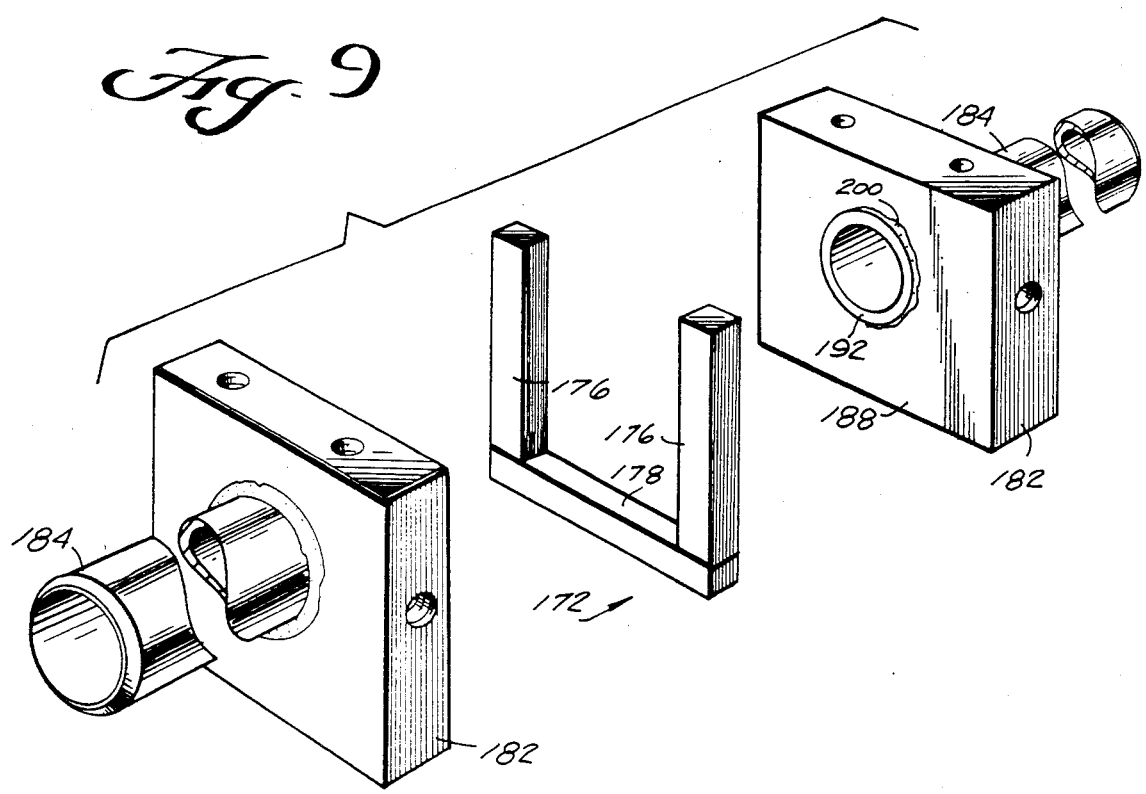
Figure 10:
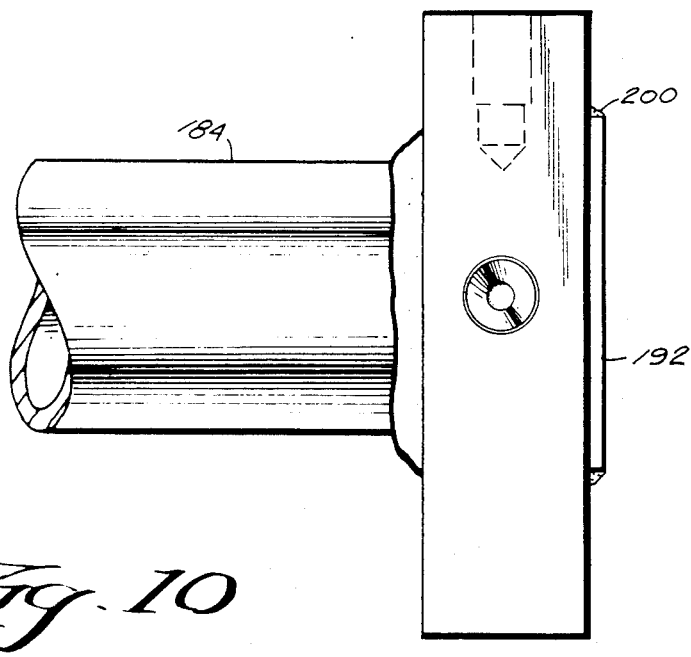
Figure 11:
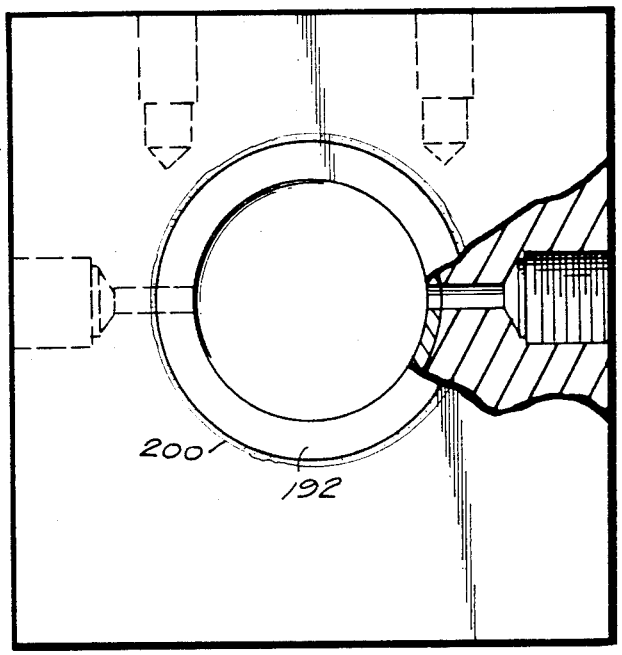
Figure 12:
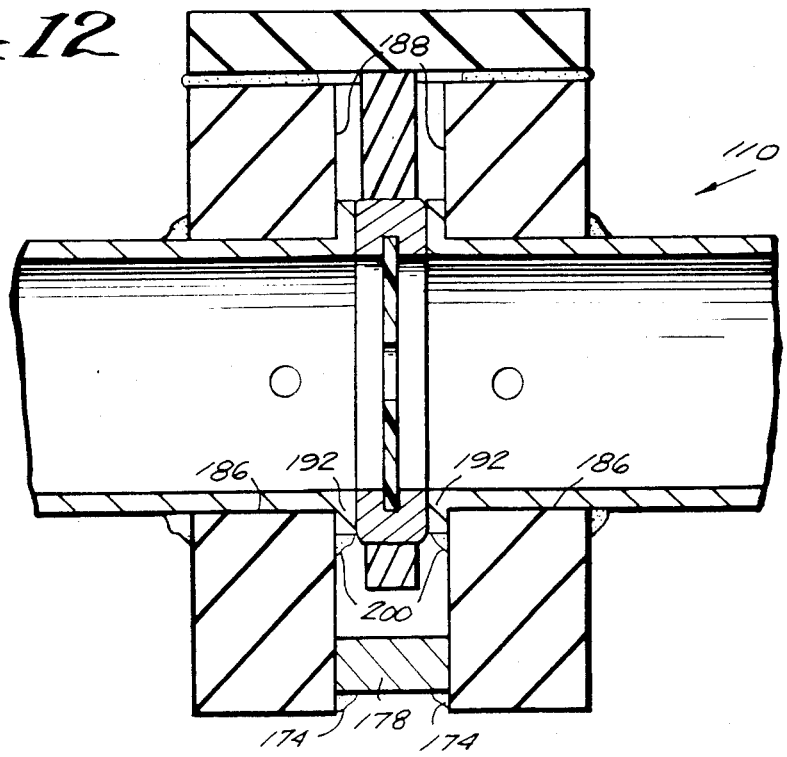

The top of the body 18 is seen to be constituted by a flat, horizontal surface 66 which includes a pattern of four upwardly-opening threaded sockets matching the patterns of the respective holes in cover and cover gasket. Further, the body is centrally provided with an upwardly opening slot 68 through the surface 66. The slot has the same laterally elongated, generally rectangular orientation and shape as the slot 60 through the cover gasket 20, but it is somewhat wider and broader than the comparable horizontal dimensions of the orifice holder 40. (With reference to FIG. 6, the slot 60 may also be seen to be somewhat deeper than the as-installed orifice holder is tall.)

Accordingly, the apparatus shown in FIG. 1 may be assembled to provide the device as shown in FIG. 2, by: inserting the orifice holder 40 downwards through the slot 60 in the cover gasket 20; sandwiching the orifice plate 12 between the sealing rings 30, 32 to constitute the orifice plate and seal assembly 28; inserting that assembly in the large opening 46 of the orifice holder 40 and centering it there so that it protrudes about as much past each face of the orifice holder; and inserting the depending bladelike portion of the resulting assembly into the slot 68 down to the hilt, i.e. until the cover gasket 20 becomes sandwiched between the flat underside of the cover 34 and the flat top surface 66 of the body 18. Then the bolts and lock washers 24, 26 are installed as shown. Changing out the orifice plate 12 merely calls for a double reversal of the steps just described.

The body 18, while being a unitary member by time it is shown in FIG. 1, is not an integral casting. Rather, it is fabricated of a small number of parts, as will be understood by referring to FIGS. 3, 4, 5 and 6. In particular, the body 18 is constituted by two identical orifice block assemblies 70 sandwiched flatwise against opposite faces of an upright, U-shaped member 72 and externally perimetrically welded at 74 in the angular direction over the outer periphery of the legs 76 and bridge 78 of the U-shaped member. Typically, the U-shaped member is 0.62 inches thick, and its outer periphery is initially indented by one quarter of an inch top, sides and bottom, relative to the peripheries of the block assemblies 70. In fabricating the orifice block assemblies 70 to the U-shaped member, the indentation or outer perimetrical groove is filled with weld metal to slight excess causing a fillet 80. This is left as-is, except for one top, where the top surface 66 is machined flat after the welding step has been completed. The gap between the legs of the U-shaped member constitutes the lateral extent of the slot 68.

Further, each orifice block assembly 70 is not formed as an integral member, but rather as fabricated of a small number of parts. Particularly, each orifice block assembly includes an orifice block 82 and a flared pipe 84.

Each orifice block 82 typically is a generally rectangular prismatic member typically 1.5 inches thick and centrally provided through its thickness with a cylindrical bore 86. At the site of the intersection of the bore 86 with the flat inner face 88 of the block 82, the bore 86 is counterbored to provide a circumferential recess 90.

The pipe 84 is substantially a right cylindrical tube, but is flared adjacent and leading to one end to provide a radially out-turned circumferential flange as at 92.

The O.D. of the pipe 84 (except for the flange 92) nominally matches the I.D. of the bore 86, and the depth of the recess 90 matches the axial thickness of the flange 92. Accordingly, the pipe 84 is assembled to the block 82 by inserting the outer end of the pipe into the inner end of the bore 86 and thrusting the pipe 84 axially outwards until the flange 92 bottoms in the counterbored recess 90. At this time the axially inner end surface 94 of the pipe 84 is flush with the flat inner surface 88 of the block and an axially outer end portion of the pipe 84 protrudes out of the outer end of the bore 86 to provide a pipe stub 64. At the intersection of the pipe stub 64 with the block 82 a circumferential weld 96 is made to unite the pipe and block into one member. If necessary, the face 88 and/or the face 94 may be machined at this stage to improve the flatness of the composite planar surface.

It should be noticed that, in addition to being provided with a respective two of the sockets 44, and the counterbored bore 86, each orifice block assembly is provided with at least one pressure tap 16, which as shown enters the respective block 82 horizontally intermediate its thickness and proceeds as a passageway parallel to the end faces of the block radially inwardly to and through the wall of the flared pipe 84. The outer portion of the tap 16 is shown being internally threaded. In the preferred embodiment, each orifice block assembly is shown provided with two diametrically opposed such taps 16, so that for any particular installation, the least accessible one may be plugged as at 96, and the most accessable one conventionally used for pressure monitoring by being connected in a conventional differential pressure measuring system (not shown).

The completed orifice block assemblies 70 are united with a U-shaped spacer member, and the orifice holder installed to constitute the orifice fitting 10, all, as described hereinabove. When the orifice holder is installed, an especially good seal is formed between the gasket rings 30, 32 and the respective composite flat surfaces 88/94, except for where the groove 54 is provided to equalize pressure on the slot cavity 60 on the O.D. of the gasket 30/32.

A presently preferred embodiment of the invention is illustrated at 110 in FIGS. 7–12. Most parts are comparable to those of the embodiment shown in FIGS. 1–6, and so are given like numerals, raised by a constant 100. Accordingly the following description is limited to pointing out the notable differences.

In the preferred embodiment 110, the bores 186 are not counterbored at the inner face 188. Accordingly, as the flared pipe 184 is inserted into the bore 186 through the inner face 188, insertion proceeds until the flange 192 engages the inner face 188 perimetrically of the bore 186. A seal, e.g. by circumferential welding is provided at 200.

Also in the preferred embodiment 110, the U-shaped member 172 is provided as an assemblage of three straight parts, two legs 176 and a bridge 178.

By preference, as the U-shaped member 178 is unitized by being welded in place between the blocks 182, the weld material need not bridge entirely over the outer surface of the U-shaped member 172. Rather, the weld material may appear in the finished article as two individual joint bridging welds 174 with some of the central region of the outer surface of the U-shaped member 172 visible between them.

Further, the gasket means 30, 32 rather than being formed as two pieces which are assembled about the orifice plate 112, may be formed as an integral member 130/132 which rims the orifice plate.

Lastly, the cover 134 of the orifice plate assembly preferably is provided with a loop-shaped handle 202, welded on at the locations of the screws 142 (not seen).

It should now be apparent that the orifice fitting for a gas pressure differential-measuring system as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A method for constructing an orifice fitting for a gas pressure differential-measuring system, comprising:
   (a) providing two block members each with an inner face and a throughbore extending through that face;
   (b) providing two lengths of pipe, each flared at the inner end thereof to define a radially outwardly projecting circumferential flange;
   (c) inserting each pipe into a respective throughbore through the inner face of the respective block member, with an outer end portion of that pipe protruding from the opposite end of the respective throughbore to provide a pipe stub extending from the respective block;
   (d) circumferentially welding each pipe stub to the respective block where that pipe stub emerges from the respective throughbore, thus providing two orifice block assemblies;
   (e) providing a U-shaped spacer having two legs and a bridge, presenting the two orifice block assemblies, inner faces inwards, in sandwiching relation to the U-shaped spacer and welding about the external periphery of the U-shaped spacer, between the U-shaped spacer and both said blocks to form a unitary body having a laterally opening slot through one side, between the legs of the U-shaped spacer and in communication with the inner ends of both of said pipes;
   (f) machining said side of said body to provide for the mounting and sealing of an orifice holder assembly thereto; and
   (g) forming a pressure tap through each said orifice block assembly and the respective pipe stub wall adjacent said slot.

2. The method of claim 1, further comprising:
   (h) providing an orifice holder assembly having a generally horizontal cover with a depending orifice holder having an opening provided through the thickness thereof;
   (i) inserting in that opening an orifice plate rimmed with a gasket;
   (j) sandwiching a perimetrically extending cover gasket between said cover and said side of said body, inserting the depending orifice holder containing said orifice plate and gasket into said slot, and sealingly securing the cover of the orifice holder assembly to said body upon said side of said body.

3. The method of claim 2, wherein:
   in conducting step (a) the two block members are each provided with a counterbore at the intersection of the respective throughbore with the respective inner face; and
   in conducting step (c), the flared inner end of each pipe is made flush with the respective block inner face by seating the respective flange in the respective counterbore.

* * * * *